United States Patent
Menzel

(10) Patent No.: US 9,844,751 B2
(45) Date of Patent: Dec. 19, 2017

(54) METHOD AND APPARATUS FOR REMOVING ABSORBABLE GASES FROM PRESSURIZED INDUSTRIAL GASES CONTAMINATED WITH ABSORBABLE GASES, WITHOUT SUPPLYING COOLING ENERGY

(71) Applicant: ThyssenKrupp Industrial Solutions AG, Essen (DE)

(72) Inventor: Johannes Menzel, Waltrop (DE)

(73) Assignee: ThyssenKrupp Industrial Solutions AG, Essen (DE)

( * ) Notice: Subject to any disclaimer, the term of this patent is extended or adjusted under 35 U.S.C. 154(b) by 283 days.

(21) Appl. No.: 14/440,451

(22) PCT Filed: Oct. 29, 2013

(86) PCT No.: PCT/EP2013/003250
§ 371 (c)(1),
(2) Date: May 4, 2015

(87) PCT Pub. No.: WO2014/067649
PCT Pub. Date: May 8, 2014

(65) Prior Publication Data
US 2015/0273386 A1 Oct. 1, 2015

(30) Foreign Application Priority Data
Nov. 5, 2012 (DE) .................. 10 2012 021 478

(51) Int. Cl.
*B01D 53/14* (2006.01)
*C10L 3/10* (2006.01)

(52) U.S. Cl.
CPC ..... *B01D 53/1425* (2013.01); *B01D 53/1462* (2013.01); *B01D 53/1468* (2013.01);
(Continued)

(58) Field of Classification Search
CPC ............ B01D 53/1425; B01D 53/1462; B01D 53/1468; B01D 53/1475;
(Continued)

(56) References Cited

U.S. PATENT DOCUMENTS 3,266,219 A 8/1966 Woertz
4,295,864 A 10/1981 Rudolph et al.
(Continued)

FOREIGN PATENT DOCUMENTS

DE 2853989 B1 11/1979
WO 2004026441 A1 4/2004
(Continued)

OTHER PUBLICATIONS

International Search Report re PCT/EP2013/003250, 2 pages.

*Primary Examiner* — Frank Lawrence
(74) *Attorney, Agent, or Firm* — The Webb Law Firm

(57) ABSTRACT

The invention relates to a method for removing absorbable gases from pressurized industrial gases contaminated with absorbable gases, without supplying cooling energy. The method includes an industrial gas that is to be purified is purified by an absorbent solvent, the absorbable gases situated therein being removed by the solvent, and the loaded solvent is passed to a stripping stage in which the absorbed gas is desorbed again, and the desorbed gas is compressed, in such a manner that it is heated by the compression, whereupon it is cooled to standard temperature by means of cooling water or cooling air, then expanded, in such a manner that it cools and this cooled desorption gas is again returned to the industrial gas, in such a manner that said industrial gas is also cooled by the admixture.

15 Claims, 2 Drawing Sheets

(52) U.S. Cl.
CPC .......... *B01D 53/1475* (2013.01); *C10L 3/103* (2013.01); *C10L 3/104* (2013.01); *B01D 2252/2021* (2013.01); *B01D 2252/2026* (2013.01); *B01D 2252/20478* (2013.01); *B01D 2257/304* (2013.01); *B01D 2257/504* (2013.01); *B01D 2259/65* (2013.01); *C10L 2290/06* (2013.01); *C10L 2290/12* (2013.01); *C10L 2290/24* (2013.01); *C10L 2290/46* (2013.01); *C10L 2290/48* (2013.01); *C10L 2290/541* (2013.01)

(58) Field of Classification Search
CPC .... B01D 2252/2021; B01D 2252/2026; B01D 2252/20478; B01D 2257/304; B01D 2257/504; B01D 2259/65; C10L 3/103; C10L 3/104; C10L 2290/06; C10L 2290/12; C10L 2290/24; C10L 2290/46; C10L 2290/48; C10L 2290/541
USPC .... 96/234, 242; 95/156, 159, 160, 169, 172, 95/177, 187, 203, 235, 236; 423/220, 423/226, 228, 229; 208/208 R
See application file for complete search history.

(56) References Cited

U.S. PATENT DOCUMENTS

| | | | | |
|---|---|---|---|---|
| 4,421,535 | A * | 12/1983 | Mehra | ........................ C07C 7/11 62/625 |
| 4,971,607 | A * | 11/1990 | Gazzi | .................. B01D 53/1493 62/632 |
| 4,997,630 | A * | 3/1991 | Wagner | ............... B01D 53/1406 423/226 |
| 7,674,321 | B2 | 3/2010 | Menzel | |
| 9,248,398 | B2 * | 2/2016 | Mak | .................... B01D 53/1425 |
| 2005/0172807 | A1 | 8/2005 | Mak | |

FOREIGN PATENT DOCUMENTS

| | | |
|---|---|---|
| WO | 2004105919 A1 | 12/2004 |
| WO | 2012121727 A1 | 9/2012 |

* cited by examiner

US 9,844,751 B2

METHOD AND APPARATUS FOR REMOVING ABSORBABLE GASES FROM PRESSURIZED INDUSTRIAL GASES CONTAMINATED WITH ABSORBABLE GASES, WITHOUT SUPPLYING COOLING ENERGY

CROSS-REFERENCE TO RELATED APPLICATIONS

This application is the United States national phase of International Application No. PCT/EP2013/003250 filed Oct. 29, 2013, and claims priority to German Patent Application No. 10 2012 021 478.2 filed Nov. 5, 2012, the disclosures of which are hereby incorporated in their entirety by reference.

BACKGROUND OF THE INVENTION

Field of the Invention

The invention relates to a method for removing absorbable gases from pressurized industrial gases contaminated by absorbable gases, without supplying cooling energy, wherein an industrial gas to be purified is purified by means of an absorbent solvent of the gases present therein which can be absorbed by the solvent, and the laden solvent is transferred to a flash stage in which the absorbed gas is desorbed again, and the desorbed gas is compressed so that it is heated as a result of the compression, whereupon it is cooled to normal temperature by means of cooling water or cooling air, is to then expanded so that it cools, and this cooled desorption gas is recycled again into the industrial gas so that this is also cooled by the admixture and a feed of cooling energy, for example by means of a refrigerating machine, is no longer necessary in order to establish the low temperature level which is required for the absorption. The invention also relates to an apparatus by means of which this method can be implemented.

Description of Related Art

During the preparation of industrial gases, a gas which is contaminated by sour gases frequently results. A typical example is natural gas which is contaminated by larger proportions of sulfur compounds and carbon dioxide. These sour gases are disruptive during the subsequent use of these industrial gases. The gases to be used have a lower calorific value and undesirable corrosive gases are created during combustion. The admixtures are frequently toxic and interrupt further processing. However, non-sour gases such as heavier hydrocarbons can also be disruptive for the subsequent application. For this reason, purifying of the industrial gases to be used is usually carried out. This is carried out in most cases by bringing the gases into contact with an absorbent solvent.

The absorption of the admixed unwanted sour gases is typically carried out by means of an absorbent solvent. Physically or chemically acting solvents are used in this case. Typical physical solvents are methanol, alkylated polyethylene glycol ether or morpholine derivatives. Typical chemical solvents are alkanolamines or alkali salt solutions. Physically acting solvents are usually used at low temperatures since the desired absorbability of this type of solvent increases at lower temperatures for components which are to be absorbed. For providing the correspondingly cooled solvent refrigerating machines are needed which require an amount of energy which is proportional to the amount of gas to be cooled. Since many industrial gases are treated with large amounts of cooled solvents for the absorption of sour gases, an appreciable cost factor is associated therewith.

WO 2004105919 A1 explains a typical process for the absorption of associated gases in industrial gases. This document explains a method for sour gas removal from pressurized natural gas contaminated by sulfur compounds, wherein the natural gas which is to be desulfurized is first of all directed into a sour-gas absorption stage where the sulfur compounds and possibly additional components are absorbed by means of a physically acting solution, the absorbate is heated, and the absorbate is transferred to a high-pressure desorption stage ("high-pressure flash stage") where the mixture is separated out into sour gas-impoverished absorbent and desorbed sour gas, and the desorbed sour gas is cooled and the evaporated absorbent is condensed out of the sour gas stream, and the sour gas-impoverished absorbent from the "high-pressure flash stage" in a further stage is freed of sour gas residues by means of stripping gas and the laden stripping gas obtained is cooled and directed into the sour-gas absorption stage, and the absorbent obtained is cooled and recycled into circulation in the sour-gas absorption stage. The regenerated absorption solution, after exchange of heat in a heat exchanger and cooling in a cooler which by means of a cooling or refrigerating medium cools down the absorbent to a temperature suitable for absorption, is recycled into the absorption process.

Since it is the aim to improve the economical efficiency of the method for sour gas absorption, efforts are consequently being made to reduce the costs for the cooling of the solvent. Since cooling plants operate with a high proportion of the overall operating costs, especially in countries with a high average temperature, a reduction of this proportion contributes to a high degree to the economical efficiency of the overall process.

In the case of physically acting absorption processes a co-absorption of gas constituents, which are not to be removed from the gas, such as e.g. hydrocarbons from natural gas or hydrogen ($H_2$) and carbon monoxide (CO) from synthesis gas, also unavoidably occurs. This is undesirable since these constituents frequently constitute useful components, the loss of which lowers the economical efficiency of the overall process. For recovering these useful components, a flash stage, for example, can be used for the retrieval in the case of physically acting absorption processes. By means of a compressor, the recovered useful components are then recycled again into the absorption. This procedure is therefore a feature in practically all physical absorption processes. A reduction of the operating costs for the cooling of the solvent should therefore be carried out so that a recovery of useful components is possible.

SUMMARY OF THE INVENTION

It is therefore the object to provide a process in which the cooling down of the industrial gas for a sour gas absorption by means of an absorbent solvent manages as far as possible without the use of an energy-intensive refrigerating plant so that availability is made for a cooled industrial gas which undertakes an effective absorption of the gases to be absorbed at a sufficiently low temperature.

The invention achieves this object by means of a method which compresses the recycled gas stream from a gas scrubber with a physically acting solvent after desorption in a downstream flash stage to a pressure which is considerably higher than the pressure of the industrial gas, wherein the gas which is heated and compressed by the compression is cooled down again to the ambient temperature by means of cooling water or cooling air and is then expanded to the industrial gas pressure so that the gas is intensely cooled as a result of the "Joule-Thomson" effect, and this cooled gas is admixed with the industrial gas so that the mixture of both gases is adjusted to a temperature which is suitable for absorption. As a result, the otherwise necessary refrigerating machine is dispensed with. Furthermore, the heat exchangers which are required for the transfer of the low temperature level of the refrigerant to the recycled gas are dispensed with, which further reduces the investment costs when using the method according to the invention. Also, using the method according to the invention leads to plants with a correspondingly lower space requirement.

The compressed recycled gas, in an advantageous embodiment, can also be cooled down in this case to such an extent that this can be liquefied at a sufficiently high recycling compressor exit pressure, and this liquefied recycled gas is admixed with, or injected into, the industrial gas in liquid form, which significantly increases the cooling capacity. This is particularly advantageous if the sour gas is to be injected back into a deposit. Resulting sour gases are frequently injected back into underground deposits in order to ensure a secure storage of these sour gases. In this case, however, a further compression of the sour gases is necessary since the sour gases result from a desorption stage under comparatively low pressure.

Especially claimed is a method for removing absorbable gases from pressurized industrial gases contaminated by absorbable gases, without supply cooling energy, wherein
an industrial gas to be purified, which is contaminated by a sour gas, is first of all directed into an absorption stage in which the gases to be absorbed are absorbed under pressure by means of an absorbent solvent, and
the absorbate is transferred into a high-pressure flash vessel in which the absorbate is separated into a solvent stripped of absorbed gases and a desorbed gas,
and which is characterized in that
the desorbed gas is compressed by means of a compressor to a pressure at which some of the sour gas contained therein is liquefied, and the compressed and desorbed gas is cooled by means of cooling water or cooling air via an indirect heat exchanger, and
the cooled compressed gas is expanded via an expansion device so that this is further cooled, and this gas is admixed with the applied industrial gas to be purified, and
the solvent, stripped of absorbed gases, is supplied for a further purification for recycling into the absorption stage.

The residual laden solvent from the high-pressure flash vessel contains the residual sour gases and is usually supplied for further purification. This can be a desorption column or an additional flash vessel, for example. During the further purification, the residual sour gases which result during the purification of the industrial gas are also obtained, and can be extracted from the process.

The cooling of a raw gas with a cooled condensate from a cooling stage is associated with the prior art. DE 2853989 B1 describes a method for treating aqueous condensate from the cooling of a raw gas of the gasification of solid fuels with oxygen, steam, and/or gasifying agents containing carbon dioxide, wherein the raw gas is cooled in at least one cooling stage, wherein a condensate is obtained, which condensate is expanded, dissipating the expansion steam, the expanded condensate is fed to a separating device, and a condensate phase consisting largely of water is extracted from the separating device and reused as cooling medium for the raw gas. The invention, however, does not describe any additional compression of the steam which with suitable means enables the cooling down of the raw gas to a temperature which is suitable for absorption of gases from gas mixtures with absorbent solvents. Also, the technical conditions under which a hot raw gas from a fuel gasification process is cooled with water are of a different nature in comparison to an absorption process with an absorbent solvent at low temperatures.

The compression of desorbed gases from a high-pressure flash stage is also to be found in the prior art. U.S. Pat. No. 3,266,219 A explains a method for removing sour gases from mixtures with gaseous $C_1$-$C_3$ alkanes by means of which the mentioned gas mixture—which contains a sour gas with carbon dioxide and hydrogen sulfide content—is brought into contact with a sour gas-absorbent solvent, and the absorbent solvent consists in the main of dimethoxyacetate, wherein the absorption conditions are established so that the sour gas is totally absorbed by the absorbent solvent and the non-absorbed gases are completely removed from the gas mixture by the solvent. In one embodiment of the invention, the carbon dioxide proportion of the sour gas with the non-sour gases contained therein is extracted from the solvent in a high-pressure flash stage, compressed, and recycled into the initial gas mixture. Expansion of this carbon dioxide proportion with the non-sour gases contained therein for the purpose of cooling the industrial gas in order to design the absorption process to be more efficient is not disclosed.

In one advantageous embodiment of the invention, the desorbed gas is expanded to the absorption pressure or to a slightly higher pressure during the process of cooling and expansion. As a result, no recompression of the desorbed industrial gas in the absorption process is necessary. In one embodiment of the invention, the desorbed gas is compressed to a pressure which is by at least 10% higher than the pressure of the industrial gas.

The desorbed gas at least partially or even totally condenses out during the process of cooling and expansion. The admixing of the recycled gas with the industrial gas is advantageously carried out by means of a mixer but, depending on the state of aggregation, can also be carried out via a gas valve or via a gas vessel. The liquid desorbed gas is added to the initial gas via an atomizer, a gasifier or a similarly styled mixer.

In one embodiment of the invention, the desorbed gas is added to the industrial gas in liquid form or partially in liquid form. In a further embodiment of the invention, the industrial gas to be purified is first of all cooled before introduction into the absorption stage before the cooled and expanded desorption gas is added. Finally, the desorbed gas can be further cooled after expansion and before introduction into the absorption stage before it is added to the industrial gas to be purified.

The cooling of the industrial gas, before the adding of the cooled and expanded desorption gas, can take place by means of an optionally designed device. It is also possible to further cool the cooled and expanded desorption gas instead of the industrial gas to be purified. This can also take place by means of an optionally designed device. These can be heat exchangers, air coolers or water coolers, for example. It is also possible to use an additional refrigerating machine, although this is not usually necessary for implementation of the invention.

The compression and expansion of the desorbed gas, which comes from the flash stage, can be carried in an optional manner. The compression can be carried out via a compressor, for example. This can be a turbocompressor or a piston compressor, for example. The expansion can also be carried out in an optional manner. This can be carried out via a throttle valve as an expansion valve, for example. However, this can also be carried out via an expansion turbine which generates rotational energy from the pressure energy. This in turn can be used for generating electric current, for example.

The flash vessel can in turn be of optional design. These are known extensively in the prior art. U.S. Pat. No. 4,997, 630 A specifies an example of a method in which flash vessels are used. In a flash vessel, readily desorbable gases are expanded by means of a sudden expansion from a pressure of 5 to 110 bar to a pressure of 0.3 to 1.0 bar. This expansion takes place at temperatures of 35 to 100° C. In the process, the expanded solvent is freed of readily desorbable gases.

Typical temperatures at which an absorption of the gas to be absorbed takes place in an absorption column are −40° C. to 20° C. and preferably −20° C. to 0° C. The pressures during the absorption are typically 20 to 200 bar. Typical pressures at which a desorption of the absorbed gas takes place in a high-pressure flash vessel are 10 to 100 bar. The temperatures during this are typically −10° C. to 80° C. and preferably 0 to 60° C. In one exemplary embodiment, the flash vessel can also be provided with filling material. A stripping gas can also be fed to the flash vessel. As stripping gases, inert gases such as hydrocarbons or nitrogen are suitable. The stripping gas in one embodiment of the invention can also be totally or partially recycled into the industrial gas to be purified.

The industrial gas to be purified can be of any type, providing it is to be purified by means of an absorbent solvent. This can be natural gas or a synthesis gas, for example. The absorbable gas can also be of any type. These for example can be sour gas components or the absorbable gas can contain these. The absorbable gas can be carbon dioxide ($CO_2$) or can contain carbon dioxide, for example. The absorbable gas however can also be hydrogen sulfide ($H_2S$) or can contain hydrogen sulfide. The absorbable gas can also contain both gases in an optional proportion. Finally, the absorbable gases can also be non-sour gases such as heavier hydrocarbons. However, it can also contain admixtures providing these do not disrupt the absorption process by means of the absorbent solvent.

The industrial gas which is purified according to the invention can be optionally reused after being purified and made available. The sour gas which is desorbed and conducted out of the plant can also be optionally reused. This for example can also be reinjected into a deposit after recompression.

Also claimed is an apparatus by means of which this method can be implemented. Especially claimed is an apparatus for removing absorbable gases from pressurized industrial gases contaminated by absorbable gases, without supplying cooling energy, comprising an absorption column, which is equipped with a feed pipe branch for an industrial gas to be purified, and a discharge pipe branch for the purified industrial gas,
a high-pressure flash vessel, which is equipped with a discharge pipe branch for desorbed sour gas and a discharge pipe branch for the sour gas-impoverished absorbent, and which is connected by means of a pipeline to the absorption column,
a compressor,
a cooler, which cools a pressurized, heated gas with cooling air or cooling water by means of indirect exchange of heat,
an expansion device, which is suitable for expanding and cooling a pressurized gas,
a mixer, which is suitable for recycling the cooled and expanded desorbed gas into the industrial gas,
and which is characterized in that
upstream of the absorption stage the discharge pipe branch for the desorbed sour gas of the high-pressure flash vessel is provided in series in the gas flow, by means of pipelines, with the compressor, the cooler, the expansion device and the mixer into the industrial gas to be purified so that the cooled and expanded desorbed sour gas can be recycled into the industrial gas to be purified.

In one embodiment of the invention, the apparatus includes at least one expansion valve as an expansion device on, or directly downstream of, the flash vessel. In one embodiment of the invention, the apparatus includes an expansion turbine as an expansion device on, or directly downstream of, the flash vessel instead of the expansion valve or throttle valve. The expansion turbine can be used for generating electric current or for operating a compressor, for example. Various auxiliary devices and secondary plant components can be allocated to the high-pressure flash vessel. These are for example compressors, pumps, heat exchangers, heaters or coolers. This can also be a desorption column in which the absorbent solvent is heated or distilled under reduced pressure.

The invention has the advantage of an energy-saving method for absorbing absorbable gases from an industrial gas. The method in a favorable embodiment manages without a refrigerating machine and as a result saves a considerable amount of energy compared with the method from the prior art. Also, by the saving of refrigerating machines considerably smaller dimensioning of the apparatus is required.

BRIEF DESCRIPTION OF THE DRAWINGS

The invention is explained more specifically with reference to two drawings, wherein these drawings represent only exemplary embodiments and are not limited to these embodiments.

DESCRIPTION OF THE INVENTION

Figure 1:
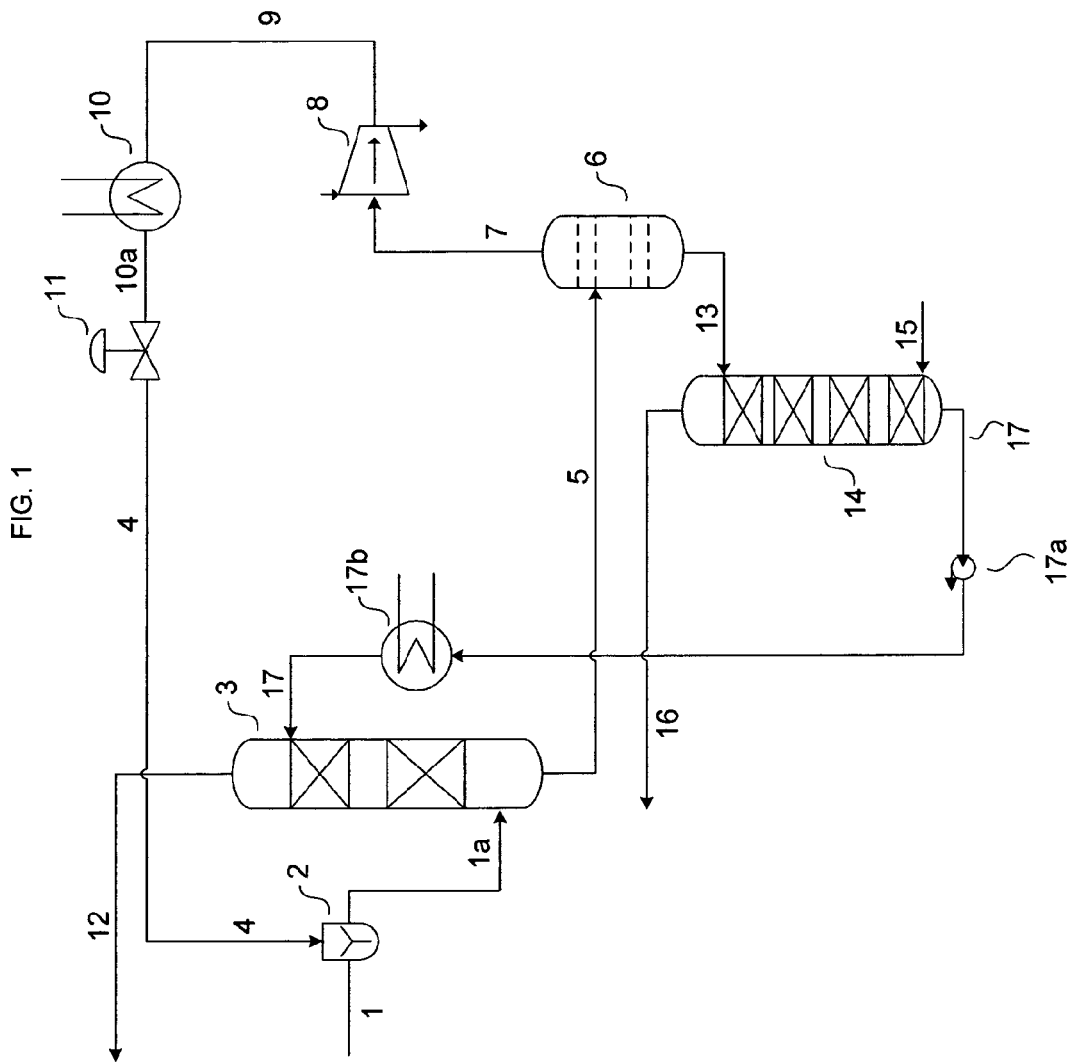
FIG. 1 shows an exemplary process implementation with absorption column, high-pressure flash vessel, compressor, cooling device and expansion valve.

FIG. 1 shows an apparatus which transfers an industrial gas (1) to be purified, which is contaminated by an absorbable gas, via a mixer (2) into an absorption column (3). The mixer (2) adds a cool and expanded desorption gas (4) so that a cooled industrial gas (1a) is introduced into the absorption column (3). There, the gas to be absorbed, which for example is a sour gas, is absorbed by an absorbent solvent. The laden solvent (5) is transferred into a high-pressure flash vessel (6). There, the laden solvent is expanded. Readily desorbable gases (7) are released in the process. According to the invention, the desorbed gas (7), which in addition to the gas components to be absorbed also contains co-absorbed useful gas components, is compressed by a compressor (8). The compressed stream of desorption gas (9) is cooled down to normal temperature by means of a cooler (10) which cools with air or water. Some of the desorption gas is liquefied in the process. The desorption gas (10a), compressed and cooled to normal temperature, is expanded via a throttle valve (11). This cools down in the process as a result of the "Joule-Thomson" effect. Some of the sour gas is liquefied in the process. The cooled and expanded desorption gas (4) is fed back via the mixer (2) into the industrial gas (1). The purified industrial gas (12) is obtained from the absorption column (3). The expanded solvent (13) obtained from the high-pressure flash vessel (6), which still contains sour gas, is transferred into a desorption column (14). There, the solvent is freed of the additional sour gas components by means of a stripping gas (15). The residual sour gas (16) is obtained in the process. The regenerated solvent (17) is received in the sump of the column and by means of a pump (17a) is recycled via a cooler (17b) into the absorption process.

Figure 2:
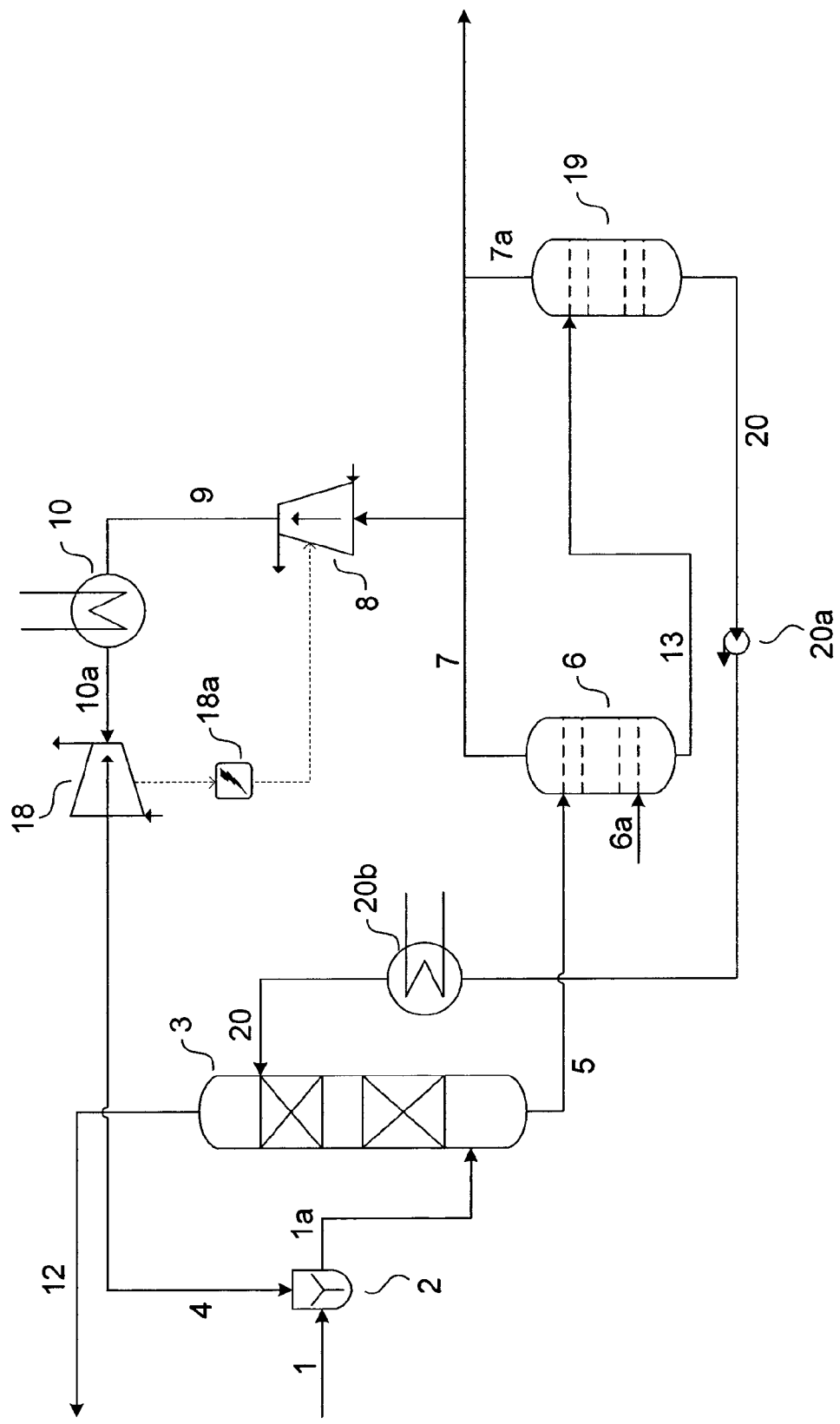
FIG. 2 shows the same apparatus which feeds stripping gas into the high-pressure flash vessel, uses an expansion turbine for generating electric current, and instead of a desorption column is equipped with two high-pressure flash vessels.

FIG. 2 shows a comparable apparatus which transfers an industrial gas (1) to be purified, which is contaminated by an absorbable gas, via a mixer (2) into an absorption column (3). The mixer (2) adds a cool and expanded sour gas (4) so that a cooled industrial gas (1a) is introduced into the absorption column (3). There, the gas to be absorbed, which for example is a sour gas, is absorbed by an absorbent solvent. The laden solvent (5) is transferred into a high-pressure flash vessel (6). There, the laden solvent is expanded. A stripping gas (6a) is fed into this for aiding the desorption process. The readily desorbable gases (7) are released in the process. According to the invention, the desorbed gas (7) is compressed by means of a compressor (8) to a pressure which lies appreciably above the pressure of the industrial gas (1). Some of the desorption gas is liquefied in the process. The compressed stream of sour gas (9) is cooled down to normal temperature by means of a cooler (10) which cools with air or water. The sour gas (10a), compressed and cooled to normal temperature, is expanded via an expansion turbine (18). This cools down in the process as a result of the "Joule-Thomson" effect and the work performed in the expansion turbine. The work (18a) performed in the expansion turbine is used in order to assist the driving of the compressor (8). The cooled and expanded sour gas (4) is recycled via the mixer (2) into the industrial gas (1). The purified industrial gas (12) is obtained from the absorption column (3). The expanded solvent (13) obtained from the first high-pressure flash vessel (6), which still contains sour gas, is transferred into a second flash vessel (19) in which further absorbed sour gas (7a) is obtained from the solvent as a result of expansion. A regenerated solvent (20) is obtained from the second flash stage (19) and by means of a pump (20a) is recycled via a cooler (20b) into the absorption column (3),

LIST OF DESIGNATIONS

1 Industrial gas
1a Cooled industrial gas
2 Mixer
3 Absorption column
4 Cool and expanded desorption gas
5 Laden solvent
6 High-pressure flash vessel
6a Stripping gas
7 Sour gas obtained from the flash stage
7a Sour gas obtained from the second flash stage
8 Compressor
9 Compressed stream of desorption gas
10 Cooler
10a Compressed and cooled desorption gas
11 Throttle valve
12 Purified industrial gas
13 Expanded solvent
14 Desorption column
15 Stripping gas
16 Residual sour gas
17 Regenerated solvent
17a Pump for regenerated solvent
17b Cooler for regenerated solvent
18 Expansion turbine
18a Work performed in the expansion turbine
19 Second flash vessel
20 Regenerated solvent
20a Pump
20b Cooler

The invention claimed is:

1. A method for removing absorbable gases from pressurized industrial gases contaminated by absorbable gases, without external refrigeration, comprising:
    directing an industrial gas to be purified, which is contaminated by a sour gas, into an absorption stage in which the gases to be absorbed are absorbed under a pressure of 20 to 200 bar by means of an absorbent solvent, and
    transferring the absorbate into a high-pressure flash vessel in which desorption occurs under a pressure of 10-100 bar and the absorbate is separated into a solvent stripped of absorbed gases and a desorbed gas,
    wherein:
    the desorbed gas is compressed by means of a compressor to a pressure at which some of the sour gas contained therein is liquefied, and the compressed and desorbed gas is cooled by means of cooling water or cooling air via an indirect heat exchanger, and
    the cooled compressed gas is expanded via an expansion device so that this is further cooled, and this desorbed gas is admixed with the applied industrial gas to be purified, and
    the solvent, stripped of absorbed gases, is supplied for further purifying for recycling into the absorption stage.

2. The method for removing absorbable gases from pressurized industrial gases contaminated by absorbable gases, without external refrigeration, as claimed in claim 1, wherein the desorbed gas during the process of cooling and expansion is expanded to absorption pressure or to a pressure higher than the absorption pressure.

3. The method for removing absorbable gases from pressurized industrial gases contaminated by absorbable gases, without external refrigeration, as claimed in claim 1, wherein the desorbed gas is compressed to a pressure which is by at least 10% higher than absorption pressure of the industrial gas.

4. The method for removing absorbable gases from pressurized industrial gases contaminated by absorbable gases, without external refrigeration, as claimed in claim 1, wherein the desorbed gas is added to the industrial gas in liquid form or partially in liquid form.

5. The method for removing absorbable gases from pressurized industrial gases contaminated by absorbable gases, without external refrigeration, as claimed in claim 1, wherein the industrial gas to be purified is cooled before introduction into the absorption stage before the cooled and expanded desorption gas is added.

6. The method for removing absorbable gases from pressurized industrial gases contaminated by absorbable gases, without external refrigeration, as claimed in claim 1, wherein the desorbed gas is further cooled after expansion and before introduction into the absorption stage before it is added to the industrial gas to be purified.

7. The method for removing absorbable gases from pressurized industrial gases contaminated by absorbable gases, without external refrigeration, as claimed in claim 1, wherein the expansion device is an expansion valve.

8. The method for removing absorbable gases from pressurized industrial gases contaminated by absorbable gases, without external refrigeration, as claimed in claim 1, wherein the expansion device is an expansion turbine, and the turbine generates useful energy.

9. The method for removing absorbable gases from pressurized industrial gases contaminated by absorbable gases, without external refrigeration, as claimed in claim 1, wherein the absorbable gas comprises a sour gas.

10. The method for removing absorbable gases from pressurized industrial gases contaminated by absorbable gases, without external refrigeration, as claimed in claim 9, wherein the absorbable gas contains hydrogen sulfide ($H_2S$), carbon dioxide ($CO_2$) or both gases.

11. The method for removing absorbable gases from pressurized industrial gases contaminated by absorbable gases, without external refrigeration, as claimed in claim 1, wherein the industrial gas to be purified is natural gas.

12. The method for removing absorbable gases from pressurized industrial gases contaminated by absorbable gases, without external refrigeration, as claimed in claim 1, wherein the industrial gas to be purified is a synthesis gas.

13. An apparatus for removing absorbable gases from pressurized industrial gases contaminated by absorbable gases, without external refrigeration, comprising:

an absorption column for absorption under a pressure of 20 to 200 bar, which is equipped with a feed pipe branch for an industrial gas to be purified, and a discharge pipe branch for the purified industrial gas, a high-pressure flash vessel for desorption under a pressure of 10 to 100 bar, which is equipped with a discharge pipe branch for desorbed sour gas and a discharge pipe branch for sour gas-impoverished absorbent, and which is connected by means of a pipeline to the absorption column, a compressor, a cooler, which cools a pressurized, heated gas with cooling air or cooling water by means of indirect exchange of heat, an expansion device, which is suitable for expanding and cooling a pressurized gas, and a mixer, which is suitable for recycling the cooled and expanded desorbed gas into the industrial gas, wherein upstream of the absorption column the discharge pipe branch for the desorbed sour gas of the high-pressure flash vessel is provided in series in the gas flow, by means of pipelines, with the compressor, the cooler, the expansion device and the mixer into the industrial gas to be purified so that the cooled and expanded desorbed sour gas can be recycled into the industrial gas to be purified.

14. The apparatus for removing absorbable gases from pressurized industrial gases contaminated by absorbable gases, without external refrigeration, as claimed in claim 13, wherein the apparatus includes an expansion valve as an expansion device.

15. The apparatus for removing absorbable gases from pressurized industrial gases contaminated by absorbable gases, external refrigeration, as claimed in claim 13, wherein the apparatus includes an expansion turbine as an expansion device.

* * * * *